US010791366B2

(12) United States Patent
Li

(10) Patent No.: US 10,791,366 B2
(45) Date of Patent: Sep. 29, 2020

(54) FAST CHANNEL CHANGE IN A VIDEO DELIVERY NETWORK

(71) Applicant: HULU, LLC, Santa Monica, CA (US)

(72) Inventor: Xiaocheng Li, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/827,941

(22) Filed: Nov. 30, 2017

(65) Prior Publication Data
US 2019/0166395 A1 May 30, 2019

(51) Int. Cl.
*H04N 21/438* (2011.01)
*H04N 21/472* (2011.01)
*H04N 7/173* (2011.01)
*H04N 21/239* (2011.01)
*H04N 21/237* (2011.01)
*H04N 21/845* (2011.01)

(52) U.S. Cl.
CPC ..... *H04N 21/4384* (2013.01); *H04N 7/17318* (2013.01); *H04N 21/237* (2013.01); *H04N 21/2393* (2013.01); *H04N 21/47217* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 7,761,902 B2* | 7/2010 | Liu | ............ | H04N 7/17318 725/151 |
| 2005/0155075 A1* | 7/2005 | Crichton | ............ | H04N 21/6581 725/105 |
| 2005/0216948 A1* | 9/2005 | MacInnis | ......... | H04N 21/23805 725/117 |
| 2006/0064716 A1* | 3/2006 | Sull | ............ | G06F 17/30793 725/37 |
| 2006/0200575 A1* | 9/2006 | Sherer | ............ | H04L 12/1881 709/231 |
| 2007/0192812 A1* | 8/2007 | Pickens | ............ | H04L 1/004 725/94 |
| 2007/0260921 A1* | 11/2007 | Cankaya | ............ | H04N 7/17318 714/18 |
| 2007/0271388 A1* | 11/2007 | Bowra | ............ | H04L 65/602 709/231 |
| 2011/0231569 A1* | 9/2011 | Luby | ............ | H04N 21/25808 709/234 |

(Continued)

*Primary Examiner* — Jason K Lin
(74) *Attorney, Agent, or Firm* — Fountainhead Law Group, PC

(57) ABSTRACT

A client establishes connections with a media server. The connections include a first connection for regular playback and one or more second connections for processing a channel change. Segments of a first video are received from the media server using the first connection in the plurality of connections. The first video is being played on a first channel in a plurality of channels. The client receives a request to change from the first channel to a second channel in the plurality of channels. A request for at least a portion of a segment of a second video being played on the second channel is sent to the media server. The request includes a channel change indicator. The client then receives the at least the portion of the segment of the second video using the one or more second connections with the media server.

21 Claims, 10 Drawing Sheets

(56) References Cited

U.S. PATENT DOCUMENTS

| | | | |
|---|---|---|---|
| 2014/0089398 A1* | 3/2014 | Zhang | H04N 21/84 709/203 |
| 2014/0201334 A1* | 7/2014 | Wang | H04L 65/4084 709/219 |
| 2014/0269932 A1* | 9/2014 | Su | H04N 21/234372 375/240.25 |
| 2014/0282754 A1* | 9/2014 | Rehman | H04N 21/61 725/81 |
| 2015/0201249 A1* | 7/2015 | Ryu | H04N 21/236 725/62 |
| 2016/0006805 A1* | 1/2016 | Ulupinar | H04L 67/02 709/217 |
| 2018/0160179 A1* | 6/2018 | Jeon | H04N 21/4722 |

* cited by examiner

US 10,791,366 B2

FAST CHANNEL CHANGE IN A VIDEO DELIVERY NETWORK

BACKGROUND

When watching television, users expect a channel change to occur very fast. In a traditional digital video broadcast environment, the channel change is able to occur very fast because a content provider sends all channels to a set top box even though the user is only watching a single channel at a time. Thus, when the user changes channel, the set top box has already received the video for the channel and can switch to displaying the video for the new channel. However, in other environments, such as in the over-the-top (OTT) environment, a channel change typically takes a longer time because all the live channels are not sent to a client device continuously; instead, they typically are sent to the client device upon request. All the channels may not be sent because there typically is a larger amount of channels being offered or the Internet connection in the OTT environment may have less bandwidth availability compared to the digital video broadcast environment. Thus, the process to change channels in the OTT environment may be slower.

DETAILED DESCRIPTION

Figure 1:
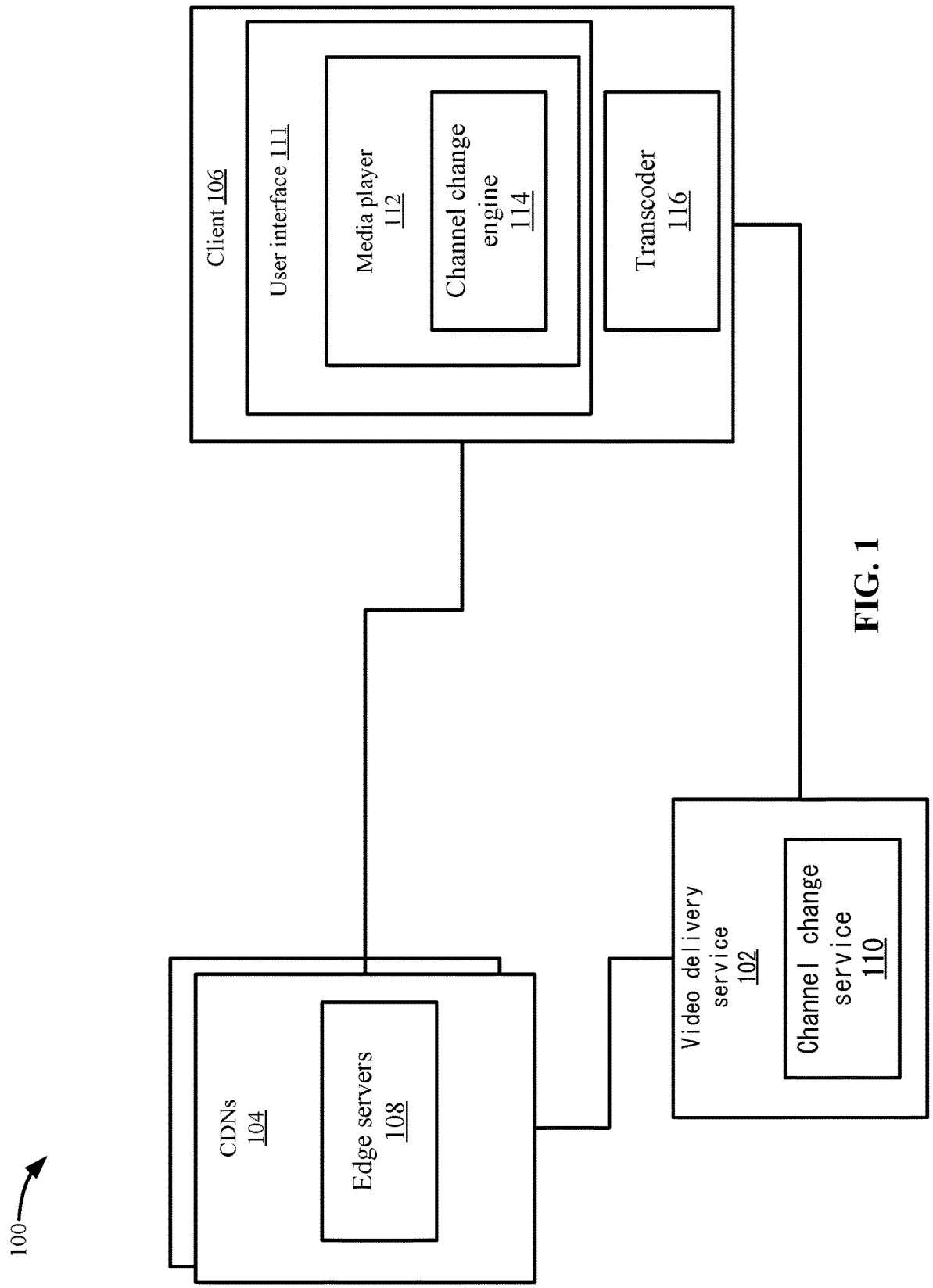
FIG. 1 depicts a simplified system for performing a channel change process according to some embodiments.

Described herein are techniques for a fast channel change system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments provide a channel change service that can change channels for a user. In some examples, the channel change service may be used in an over-the-top (OTT) environment in which videos are streamed to a media player on a client device using a streaming protocol. In some embodiments, the streaming protocol may be a hypertext transfer protocol (HTTP)-based media streaming protocol, such as HTTP live streaming (HLS), dynamic adaptive streaming over HTTP (DASH), or other segment based manifest protocols. The channel change service reduces the channel switching time compared to methods described in the Background and also allows a user to skip directly to any channel that is being offered in a live television service and experience a similar channel change time.

In the fast channel change service, a client device can establish multiple connections with multiple edge servers. That is, the client device has multiple connections open with each edge server. For one of the edge servers that is currently being used to play the video during number playback, the connections may include a first connection that is used for regular playback of video and the other connections are used when processing a channel change. These other connections remain idle until a channel change request is received. For other edge servers, all connections may remain idle until a channel change request is received.

The media player of the client device can start playback of a video for a first channel that is being offered by a video delivery service with a first edge server. The first edge server may be a media server that delivers the video using a first connection for regular playback. When a media player receives a channel change request to change from the first channel to a second channel, the media player may request at least a segment of a video being offered on the second channel. The media player also inserts a channel change indicator in the request that indicates that this is a channel change request and not a regular playback request. Further, instead of just sending a request to the first edge server, the media player can send requests for different byte ranges for the segment of the video being played on the second channel to multiple edge servers. For example, the media player may send a first request for the byte range 0-200 bytes of the segment to the first edge server, a second request to a second edge server for a byte range 201-400, a third request to a third edge server for a byte range 401-600, and so on.

When the edge servers receive the requests, the edge servers determine that the requests include the channel change indicator. This indicates to the edge servers that the fast channel change process should be initiated. In some embodiments, the edge servers invoke a high priority thread that manages the fast channel change process. The high priority thread may use a different algorithm to send the video than the normal priority thread, such as using an algorithm that may be more aggressive in sending the video at higher speeds. For example, the high priority thread may send the video at a higher speed from the beginning of the transmission. In contrast, the regular playback algorithm may use grade climbing that starts with using a smaller bandwidth and gradually increases the bandwidth used. Also, the high priority thread may be given a higher priority to execute in the edge servers. Further, the high priority thread may start sending the byte range to the media player of the client device using all the connections that are open with the client device. This may increase the throughput and speed for sending the bytes.

When the media player receives the bytes from the multiple edge servers, the media player reassembles the bytes for the one or more segments. Additionally, as will be discussed in more detail below, a transcoder may have been decoding the video for the prior channel using sequential timestamps. For example, each frame of the video may be associated with a time stamp. If the timestamp for the next video frame is not sequentially the next timestamp, then the transcoder may have to be reset. Accordingly, the media player may change the timestamp that is received for frames in the segment that is received for the second channel. This allows the transcoder to continue transcoding the video without having to be reset.

In addition to performing the above process, the media player may also receive thumbnails from one or more of the edge servers of a few images of video for the second channel that the media player can animate to simulate the video being played. This may give the impression to a user that the channel change has already been performed and the video has started. Once the animation is finished, the media player can start displaying the one or more segments may have been decoded.

FIG. 1 depicts a simplified system 100 for performing a fast channel change process according to some embodiments. System 100 includes a video delivery service 102, one or more content delivery networks (CDNs) 104, and a client 106. Video delivery service 102 may include one or more servers that communicate with CDNs 104 and client 106. Also, although a single client 106 is described, it will be understood that the fast channel change process may occur with multiple clients.

Client 106 may be a computing device that can play video, such as a smartphone, tablet device, streaming device, set top box, or other device. Also, client 106 may include a user interface 111 that displays a media player 112 that plays the video. Although a single instance of client 106 is described, it will be understood that the video may be played on another device. For example, a streaming device may display media player 112 on a television.

CDNs 104 include edge servers 108 that are located in different areas, such as different locations. In some embodiments, it is preferable that edge servers 108 that are closest to client 106 are used to deliver video. Although multiple CDNs 104 are described, it will be understood that only a single CDN 104 in a single location may be used. However, multiple CDNs 104 including multiple edge servers 108 at different locations may also be used. Also, although edge servers that may be located at the edge of CDN 104 and be the server at the edge of the CDN to delivery video to clients, any type of server may be used.

Video delivery service 102 may provide a video service that allows users to view on-demand videos in a video library and also view live television on different channels. The live television service provides multiple channels, such as networks and movie channels that provide serial programming at set times. Client 106 can request either an on-demand video or tune to one of the channels being offered by the live television service.

Video delivery service 102 includes a channel change service 110 that can configure the fast channel change. For example, channel change service 110 can communicate with edge servers 108 to configure them to process fast channel changes for client 106. In some embodiments, to perform the fast channel change service, video delivery service 102 may have control over edge service 108 and can configure the edge servers to perform the fast channel change process described below. This is different from using an edge server that is controlled by a different company and used to serve video for multiple companies. The other company may not allow the edge server to be configured for a fast channel change process due to server limitations, such as leaving connections idle after a time period may not be efficient use of computing resources. In this example, channel change service 110 can direct client 106 to edge servers that are controlled by video delivery service 102.

Video delivery service 102 may also provide the video for the live channels to CDNs 104. In addition to this, as will be discussed in more detail, channel change service 110 may provide thumbnails for the video, such as thumbnails for every second of a video, which client 106 can use to generate an animation when a channel change occurs.

As discussed above, edge servers 108 use a streaming protocol that requests segments, such as an HTTP protocol in which client 106 requests segments of video and receives those segments of video from edge servers 108. The streaming protocols uses manifests that list segments of the video to request. Video delivery service 102 may provide the manifests to client 106 for all the live channels that client 106 can use to request segments of a video. The manifests list identifiers for segments of the video being offered on each channel. Also, video delivery service 102 may provide the manifests for all live channels to edge servers 108 such that edge servers 108 can identify the segments that are requested by clients 106.

In client 106, media player 112 includes a channel change engine 114 that can perform the fast channel change. As will be discussed in more detail below, channel change engine 114 may communicate with edge servers 108 when the channel change request occurs.

Client 106 also includes a transcoder 116 that decodes segments of video that are received from edge servers 108. Transcoder 116 decodes encoded video received from edge servers 108, and provides the decoded video to media player 112. Media player 112 can then display the decoded video.

Transcoder 116 includes certain requirements to continuously decode video without resetting, such as when decoding video, a timestamp a portion of the video, such as for each frame being decoded should be sequential. To continue decoding a video, this timestamp must continue to the next sequential number or the transcoder needs to be reset. For example, the video may have timestamps that start from #0 and go to #200. If transcoder 116 is on frame #100, if a frame with a timestamp of #90 is received, transcoder 116 will reset. The resetting of transcoder 116 may delay the decoding of video, which delays the display of the video.

The use of the above features will now be described in a fast channel change process.

Playback of Video from a First Channel

Figure 2:
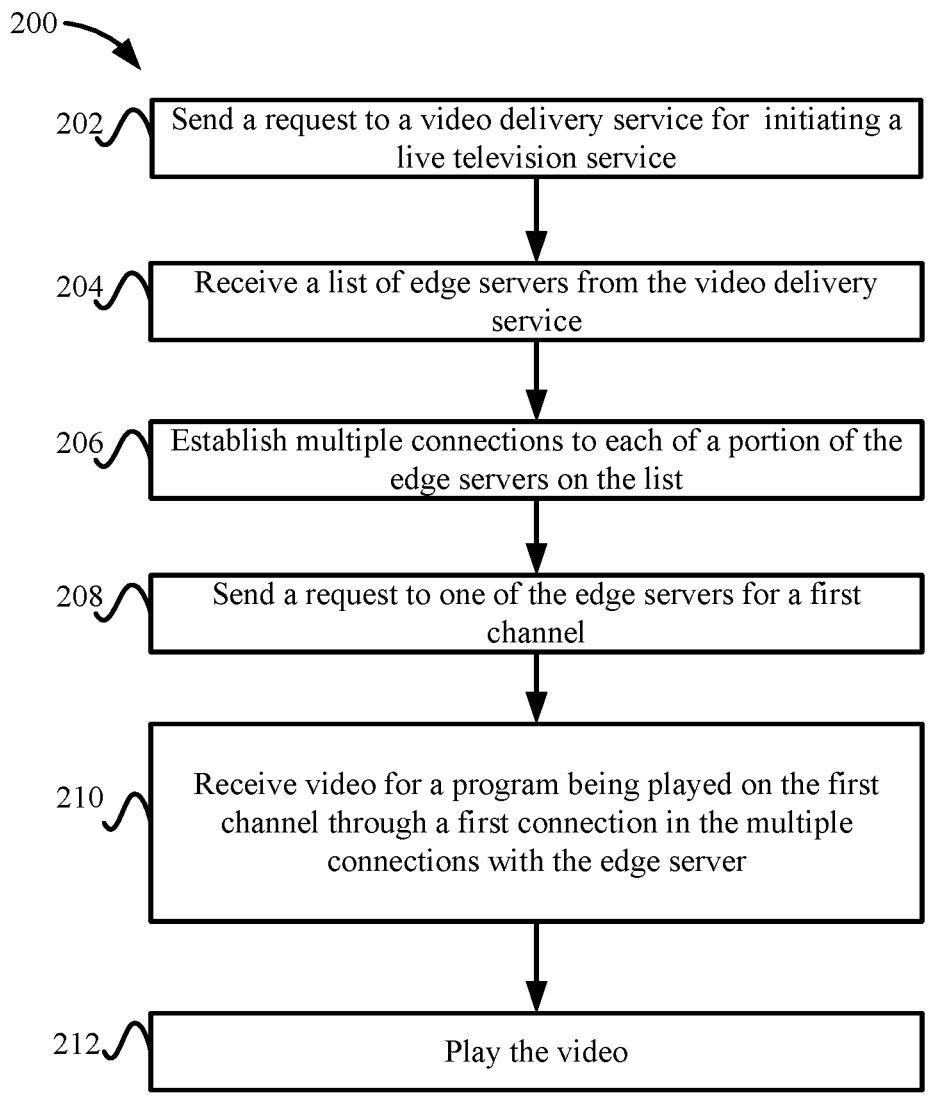
FIG. 2 depicts a simplified flowchart of a method for starting playback of a video for a channel according to some embodiments.

FIG. 2 depicts a simplified flowchart 200 of a method for starting playback of a video for a channel according to some embodiments. At 202, client 106 sends a request to video delivery service 102 for initiating a live television service. For example, client 106 may load user interface 111, which displays different options for on-demand video and live television. When the user interface 111 is initialized, client 106 may send the request to servers of video delivery service 102. For the discussion, when client 106 is discussed, it will be understood that any component of client 106 may perform the action, such as user interface 111, media player 112, or other applications running on client 106.

At 204, client 106 receives a list of edge servers from video delivery service 102. For example, video delivery service 102 may use a location of client 106 that is included in the request to determine edge servers that are located proximate to client 106. Also, video delivery service 102 may use user profile information for the user that indicate where the user resides. Some CDNs 104 may include edge servers 108 that are located closer to the location of client 106 and may be able to provide faster video delivery.

Although edge servers 108 that are located proximate to client 106 may be returned, it will be understood that other factors may be taken into account, such as video delivery service 102 returns edge servers 108 that have the most available bandwidth.

At 206, client 106 establishes multiple connections to each of at least a portion of the edge servers 108 on the list. That is, for each edge server 108 that client 106 establishes a connection, client 106 establishes multiple connections with that edge server, not just one. To allow the multiple connections to be made, channel change server 110 may configure edge server 108 to support connections made from the same client identifier, such as from the same Internet Protocol (IP) address. In some examples, a first connection to an edge server 108 may be for the sending and receiving of video for a channel during normal playback. The other connections may be reserved for when a channel change request occurs and remain idle during the normal playback process. As will be discussed in more detail below, edge server 108 are configured to keep these connections idle, but will not close them even though no traffic is being sent on the connections past a time limit. In some embodiments, because video delivery service 102 controls edge servers 108, edge servers 108 are configured to not close these connections when idle. Typically, when no traffic occurs on connections, edge servers 108 close the connections. However, video delivery service 102 can configure edge servers 108 to not close these connections by removing any time limits for closing idle connections.

At 208, client 106 sends a request to one of the edge servers 108 for a first channel. For example, a user may want to watch a video being offered at that time on the first channel and inputs a request for that channel in user interface 111. The edge server 108 receives the request and can start to send video for the channel. The video that edge server 108 sends is the video for a program being offered on that channel at that time. At 210, client 106 receives the video for the program through a first connection in the multiple connections that are open with edge server 108. The first connection is the connection that edge server 108 uses during normal playback (not when a channel change is occurring). At 212, media player 112 then plays the video. For example, transcoder 116 decodes the video and then media player 112 plays the decoded video.

Connection Creation

Figure 3:
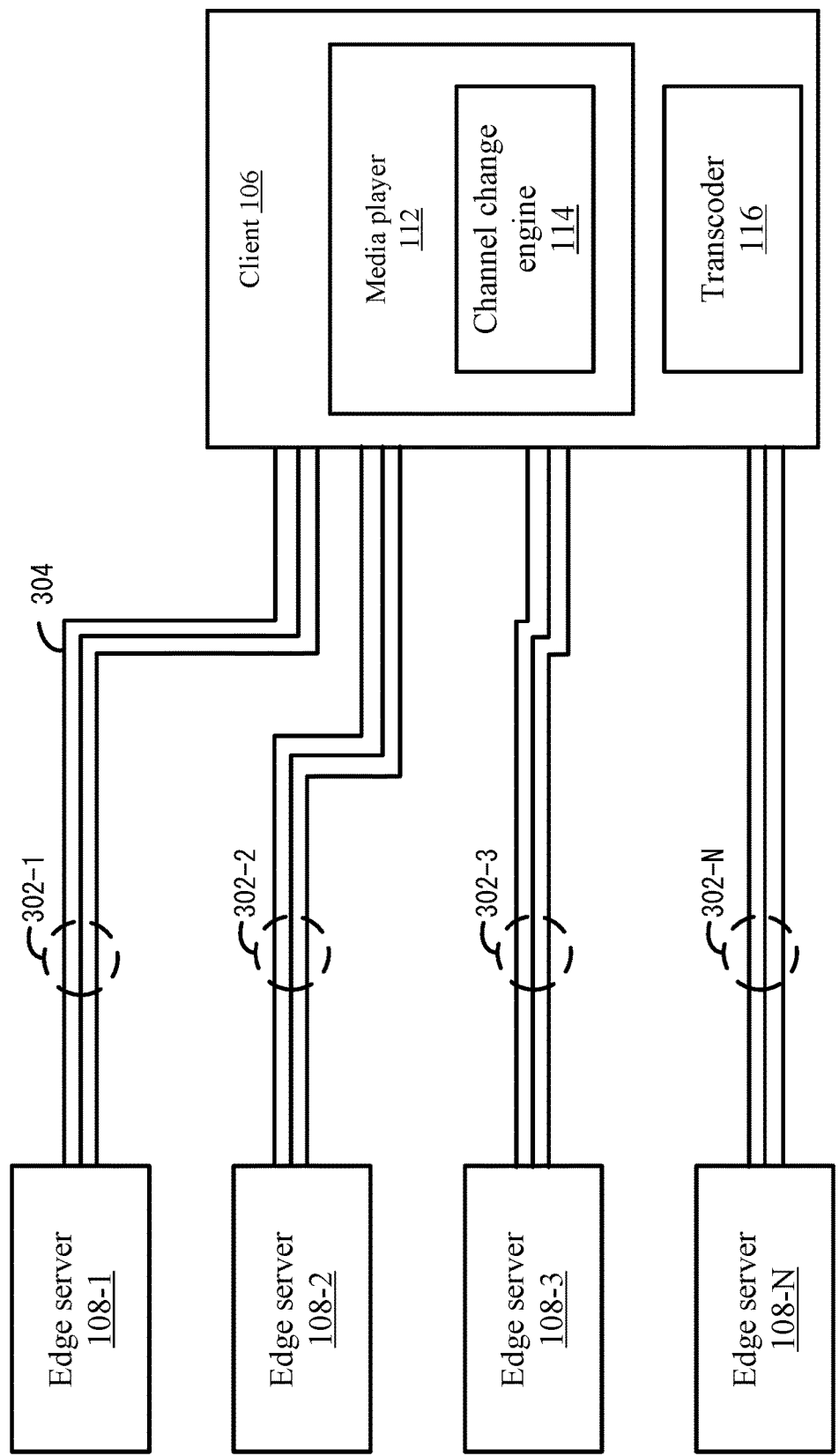
FIG. 3 depicts an example of creating multiple connections to edge servers according to some embodiments.

Although client 106 can perform the fast channel change process with a single edge server 108, using multiple edge servers 108 may make the fast channel change process faster. FIG. 3 depicts an example of creating multiple connections to edge servers 108 according to some embodiments. Client 106 opens up multiple connections with each edge server 108-1 to 108-N at 302-1 to 302-N, respectively. The number of edge servers 108 from the list may be configured statically, such as client 106 always opens up connections to four edge servers 108-1 to 108-N; however, client 106 may open up a variable number of connections to a variable number of edge servers. For example, the number of connections between client 106 and each edge server 108 may vary based on conditions at edge server 108. In some examples, an edge server 108 with more processing resources may allow client 106 to open up more connections. In other examples, client 106 may open up a pre-defined number of connections with edge server 108, such as edge server 108 may keep five to ten connections open with client 106 compared to traditionally one to two connections per device. Also, the number of edge servers 108 may vary based on how many edge servers are located near to client 106, or may be preset.

As discussed above, during normal playback, when client 106 receives video from an edge server, such as edge server 108-1 for the first channel, only one connection is being used as shown at 304. All other connections shown in FIG. 3 may be idle. In some embodiments, edge servers 108 may be able to support 100,000 connections in parallel. However, in the fast channel change process, one session may require one to six megabytes per second (Mbps) bandwidth and a 10 gigabyte (Gbps) network interface card (NIC) may only support several thousand clients. However, this allows edge server 108 to keep ten idle connections with each device for the fast channel change process.

Figure 4:
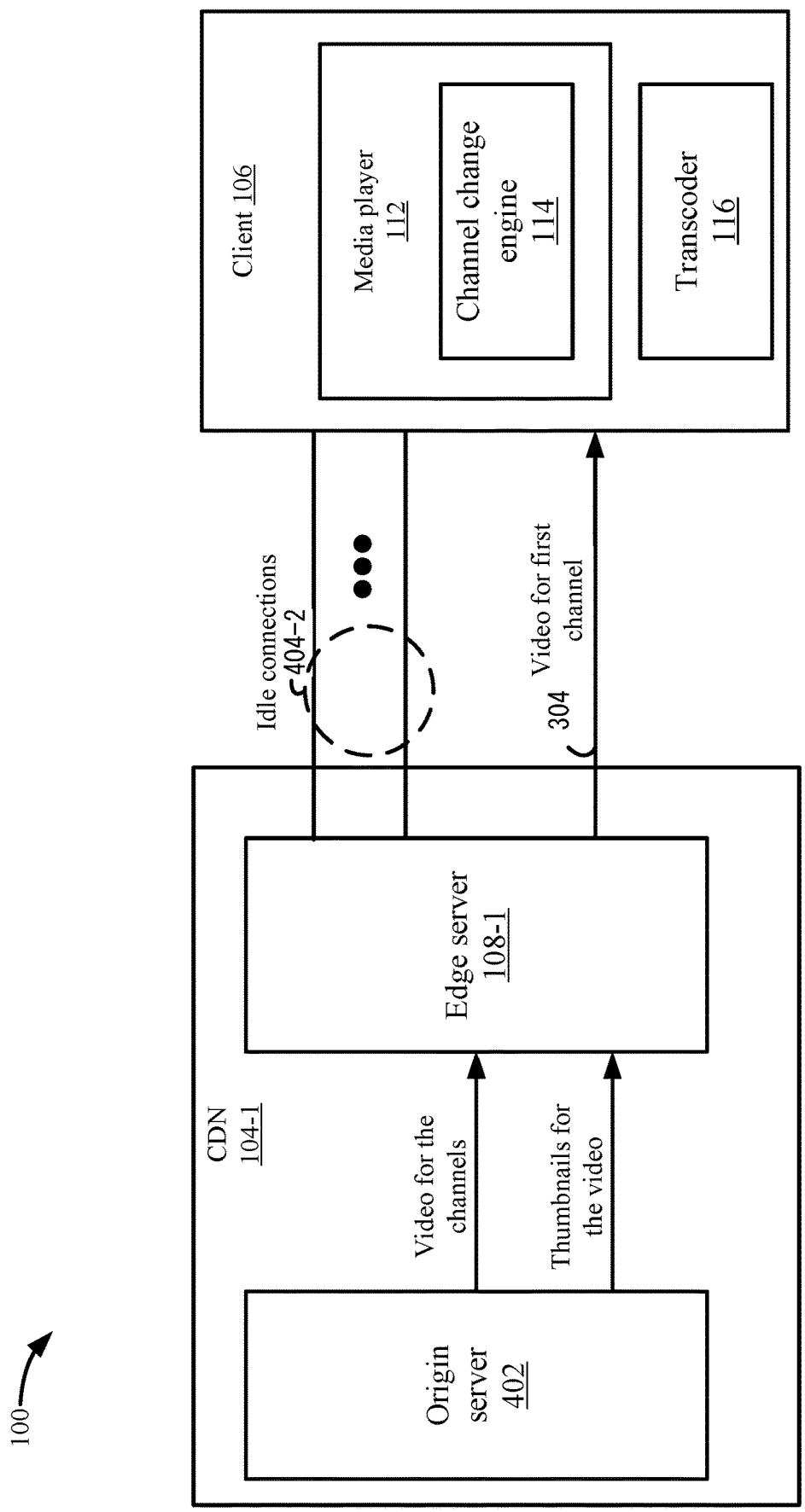
FIG. 4 shows an example of the connection with an edge server when receiving video for the first channel according to some embodiments.

FIG. 4 shows an example of the connection with edge server 108-1 when receiving video for the first channel according to some embodiments. CDN 104-1 may include an origin server 402 that may receive videos for programs being offered for all the channels from video delivery service 102. Origin server 402 may then provide video for these channels to other edge servers 108, such as edge server 108-1. In some embodiments, origin server 402 may provide the video for all the channels in a push model (origin server sends the videos without receiving requests from edge servers). In other embodiments, origin server 402 may only provide video for channels that are actively being requested by clients 106 in a pull model (edge servers request the videos). Also, origin server 402 may push the manifests for all channels to edge server 108, which allows the edge server to process channel change requests that request segments from other channels.

Origin server 402 may also push thumbnails for the video to edge servers 108, such as edge server 108-1. Origin server 402 may receive the thumbnails from video delivery service 102 and push them to edge server 108-1 continuously, such as every second. In other embodiments, video delivery service 102 may send the thumbnails directly to edge server 108-1. The thumbnails may be for video for all the channels being offered and may be lower resolution than the video. For example, video delivery service 102 sends lower resolution thumbnails for every second or frame of the video. As will be discussed in more detail below the thumbnails allow media player 112 to generate an animation while the channel change is being processed.

Edge server 108-1 then delivers the video for the first channel to client 106 at 304. Additionally, at 404-2, idle connections between edge server 108 and client 106 are shown. These connections are not sending any data at this time.

Fast Channel Change Process

Figure 5:
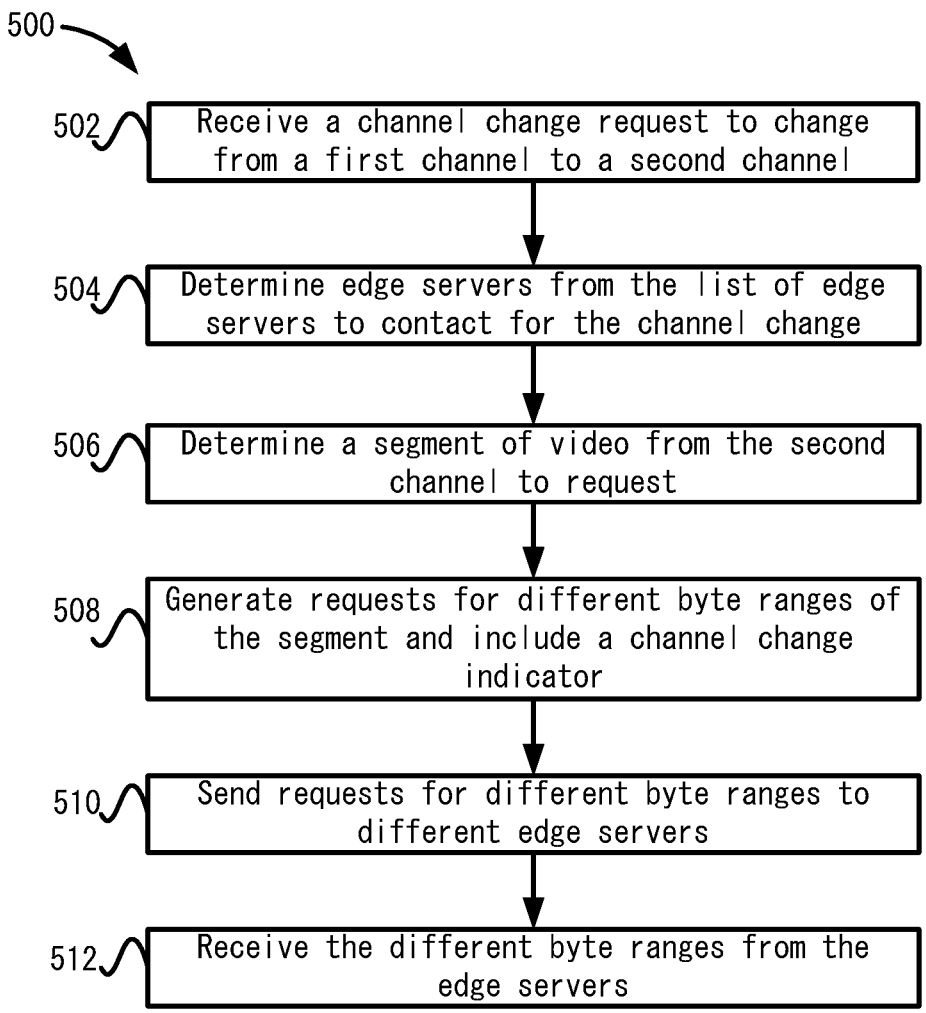
FIG. 5 depicts a simplified flowchart of a method for processing a channel change request according to some embodiments.

At some point, client 106 may receive a channel change request from a user. For example, user interface 111 may receive the channel change request. In some embodiments, edge server 108 is only sending video for a single channel to client 106. That is, edge server 108 is not sending video for multiple channels to client 106 before a channel change request is received. FIG. 5 depicts a simplified flowchart 500 of a method for processing a channel change request according to some embodiments. At 502, user interface 111 receives a channel change request for changing from a first channel to a second channel. In some examples, user interface 111 receives the channel change request from a user. It is noted that the first channel and the second channel do not need to be sequential, such as a user may change from a channel offered in the live television service to any other channel and experience a similar channel change time.

At 504, client 106 determines edge servers 108 from a list of edge servers 108 to contact for the channel change. For example, as discussed previously, client 106 may have previously opened multiple connections with edge servers 108 before receiving the channel change request. Client 106 may contact some or all of these edge servers 108 to perform the fast channel change.

At 506, client 106 determines a segment of video from the second channel to request. For example, for the fast channel change process, client 106 may request a single segment of the video, which may be a certain length of video, such as one to ten seconds of video. In other examples, client 106 may request multiple segments, such as two to four segments, to perform the channel change. A single segment will be described for discussion purposes, but it will be understood that multiple segments may be requested.

At 508, client 106 generates requests for different byte ranges of the segment and includes a channel change indicator in the requests. The channel change indicator indicates to edge servers 108 that this request for the byte range of the segment is for a channel change. Because client 106 received the manifests for all the channels being offered, client 106 can then determine which is the next segment to request for the video being offered on the second channel. For example, client 106 determines the segment being offered at the present time on the second channel without having to request the manifest for the second channel. Because the request for the segment of video is sent to edge servers 108, client 106 uses an indicator to edge servers 108 that this is for a channel change request rather than just a regular request for a portion of the segment. The indicator causes edge servers 108 to use the fast channel change process rather than the regular playback process. In some examples, the channel change indicator may be a flag or byte that is set in the request to indicate that the request is for a channel change. Edge server 108 processes the channel change requests using the fast channel change process and when the fast channel change process is finished, then edge server 108 returns to streaming of the video using the normal process of streaming through only a single connection.

At 510, client 106 sends the requests for the byte ranges to different edge servers 108. For example, client 106 requests for different portions of the segment to the different edge servers. Although sending requests to different edge servers 108 is described, the process may be performed using a single edge server 108 that receives one or more requests for one or more segments.

Figure 6:
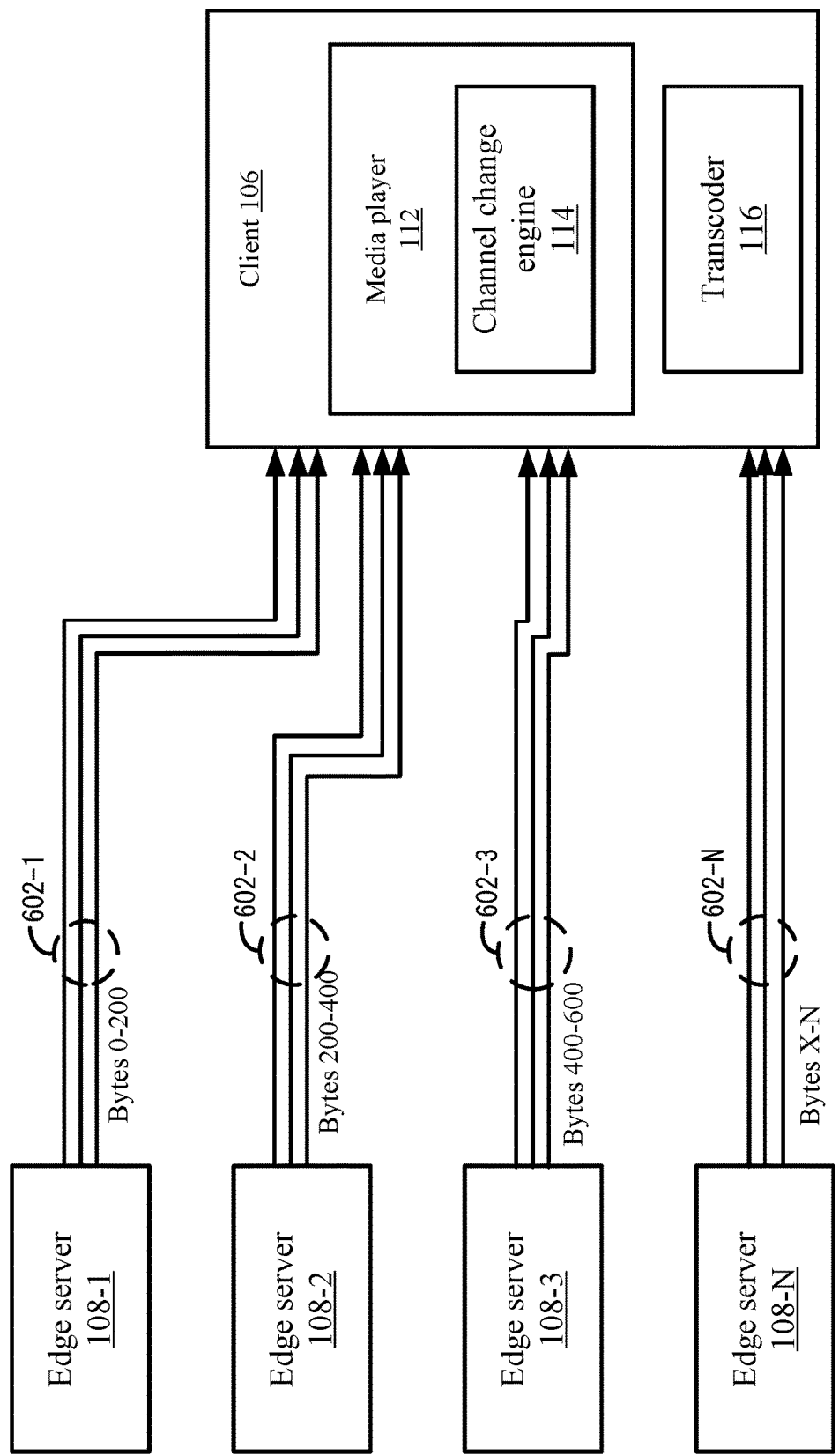
FIG. 6 depicts an example of showing the receiving the different byte ranges from multiple edge servers according to some embodiments.

At 512, client 106 receives different byte ranges from edge servers 108 via multiple connections. FIG. 6 depicts an example of showing the receiving the different byte ranges from multiple edge servers 108 according to some embodiments. Edge servers 108-1 to 108-N may receive requests for different byte ranges for the segment. Then, edge servers 108-1 to 108-N can invoke a fast channel change process that processes the request for the byte range. The fast channel change process may invoke a high priority thread, such as a CPU affinity thread, that has priority on a CPU can initiate the transfer of the bytes on multiple connections. For example, if one connection was already established and active between edge server 108-1 and client 106, the connection information, such as the socket, may be transferred to the other connections for use in transferring the bytes. In some examples, all three connections shown at 602-1 may transfer some portion of the byte range 0-200. In some embodiments, one socket can be sent to normal thread/process and then get dispatched to another thread via a communication mechanism, such as via an inter-process communication (IPC). Also, client 106 may directly send a request to the channel switching connections with the connection information. For example, if there are eight CPUs on one edge server, then the edge server can have six thread/processes to handle normal requests and two thread/processes for channel switching requests. The normal thread/processes may process 1000 requests/second (RPS) and the switching thread/processes may process 50 RPS, but need to keep idle connections. Also, edge servers may be reserved for just processing switching request. For example, six edge servers are reserved for normal playback and two switching servers are reserved to serve switching requests. The requests can be dispatched from one server to another, and also clients 106 can be notified which server is switching server then client 106 sends a request to the switching server.

For edge servers 108-2 to 108-N that were not transferring video prior to the channel change request, edge servers 108-2 to 108-N may receive the channel change request and then invoke the fast channel change process. Similarly, edge servers 108-2 to 108-N may use a high priority thread that activates the connections automatically that were previously established between the edge servers and client 106. The connection information that was received in the request from client 106 may be used and transferred to the other connections that were idle.

As shown, edge server 108-2 may transfer bytes 201-400 in connections shown at 602-2; edge server 108-3 may transfer bytes 401-600 in connections shown at 602-3; and edge server 108-N may transfer bytes X-N in connections shown at 602-N. However, it will be understood that other byte ranges and other edge servers 108 may be used to transfer the bytes.

Figure 7:
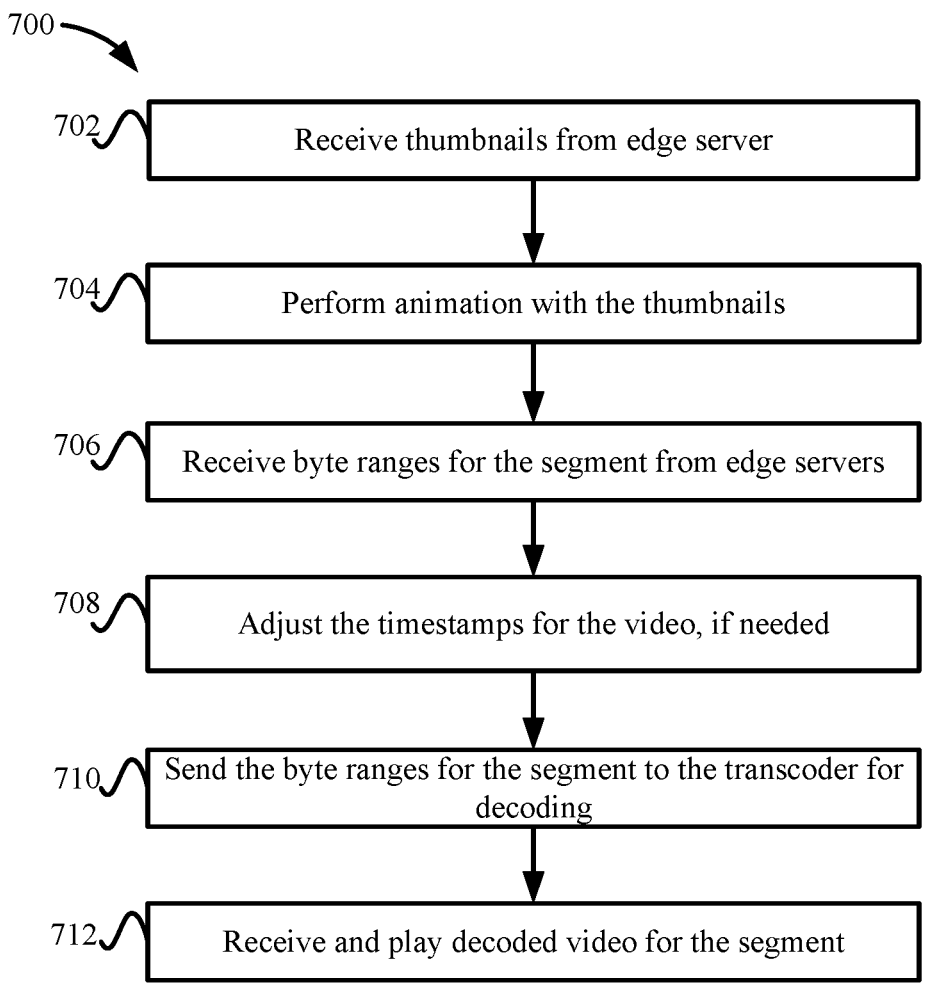
FIG. 7 depicts a simplified flowchart of a method for performing the channel change at client 106 using the thumbnails according to some embodiments.

Client 106 may receive the byte ranges and transcoder 116 may decode the bytes received. However, during the decoding process, client 106 may display thumbnails in an animation to make it seem to the user that the channel change is occurring quicker. FIG. 7 depicts a simplified flowchart 700 of a method for performing the fast channel change at client 106 using the thumbnails according to some embodiments. At 702, client 106 receives thumbnails from edge server 108. For example, any number of edge servers 108-1 to 108-N that receive the channel change request may send the thumbnails. In some embodiments, the edge server 108-1 that was previously sending video for the first channel may send thumbnails for the second channel. The thumbnails are a reduced resolution image of the first few frames of the segment. For example, ten thumbnails may be sent to client 106. Transcoder 116 may decode the thumbnails and provide them to media player 112. At 704, media player 112 then generates an animation with the thumbnails. For example, media player 112 may display the thumbnails in succession to create an animation of the video being played.

At 706, client 106 receives byte ranges for the segment from edge servers 108-1 to 108-N. In some instances, the byte ranges may be received in varying order. Transcoder 116 may arrange the byte ranges in order as they are received. For example, transcoder 116 may store the byte ranges in a buffer in an order.

At 708, client 106 adjusts the timestamps for the video, if needed. For example, media player 112 may adjust the timestamps for the byte ranges received based on the previous timestamp that was used for the first channel. If, for instance, transcoder 116 was on a frame #100 for the first channel, then transcoder 116 would expect to receive the next frame with a timestamp #101. However, if the timestamp for the frames in the segment received for the second channel start at #90, then transcoder 116 would have to be reset because this timestamp is not in sequential order. Accordingly, media player 112 may adjust the timestamps for the video that is received to be sequential from the last timestamp received from the first channel. This allows transcoder 116 to continue decoding the video without being reset. For example, media player 112 may adjust the timestamp for the first frame received for the segment to #101 and adjust the rest of the timestamps for the video in an ongoing basis. For example, if the first video for the first channel had timestamps from #0 to #200, and the second video had timestamps from 0 to 300, then media player 112 adjusts the timestamps from #90 to #300 to #101 to #310.

At 710, transcoder 116 receives the byte ranges for the segment and decodes the byte ranges. At 712, media player 112 then receives and plays the decoded video for the segment. At some point after the fast channel change process is finished, channel change engine 114 may then proceed to request segments from only the single edge server 108 using the normal playback process and without including the channel change indicator in the request.

Edge Server Channel Change Process

Figure 8:
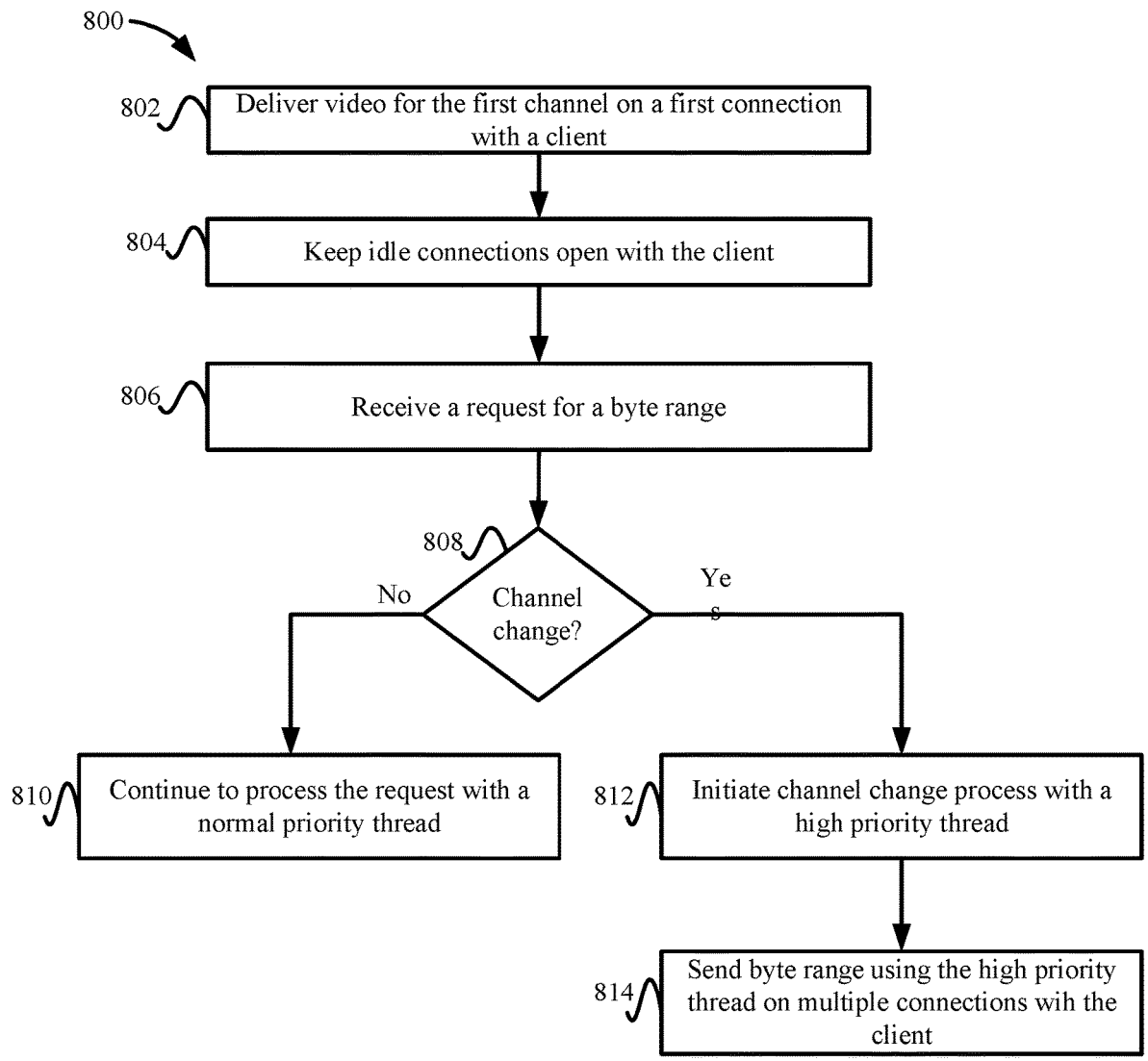
FIG. 8 depicts a simplified flowchart of a method performed on the edge server for a channel change according to some embodiments.

FIG. 8 depicts a simplified flowchart 800 of a method performed on edge server 108 for a fast channel change according to some embodiments. At 802, edge server 108 delivers video for a first channel on a first connection with client 106. Edge server 108 also uses a normal playback process to provide the video on the first connection and not any of the other connections to client 106. The normal playback process may also use a streaming algorithm that gradually steps up the bandwidth used. For example, the streaming algorithm may first send a small amount of bytes, receive an acknowledgement that the client received the bytes, send a slighter larger amount of bytes, receive an acknowledgement, and continue doing so until a certain amount of bytes is reached. This gradual increase is used to test the available bandwidth.

At 804, edge server 108 keeps idle connections open with client 106. For example, edge server 108 may not be configured to close connections in which communications on the connection have not occurred after a certain period of time. In some examples, edge server 108 keeps the idle connections until the first connection is closed.

At 806, edge server 108 receives a request for a segment of video. The request may be for a byte range. The request for the byte range may be for the same video that is being offered on the first channel or may be for another video being offered on a second channel.

At 808, edge server 108 determines whether or not a channel change has occurred. For example, edge server 108 reviews the request to determine whether or not a channel change indicator has been included in the request by media player 112. If a channel change indicator has not been included in the request, then edge server 108 continues to process the request using a normal priority thread. The normal priority thread may have a priority that is not high priority and may not be assigned to a dedicated CPU.

If the channel change indicator is included in the request, at 812, edge server 108 initiates a fast channel change process using a high priority thread. The high priority thread has a priority that is higher than the thread that was being used to process the first channel for regular playback. For example, edge server 108 may assign the high priority thread to a CPU that is dedicated to processing channel change requests or the high priority thread has priority over other threads that are processing other tasks to ensure that the channel change is processed with high priority. Also, the fast channel change process also includes activating other connections between edge server 108 and client 106.

At 814, edge server 108 sends the byte range that was requested using the high priority thread on the multiple connections with client 106. For example, the byte range that was requested may be split among the multiple connections with client 106 and sent to client 106. Also, edge server 108 may send the video using a different streaming algorithm, such as one that attempts to use the most bandwidth available. Edge server 108 may have been monitoring the available bandwidth between client 106 and itself during normal playback. Edge server 108 may then determine a higher bandwidth to send the video, such as either the highest bandwidth reading received, the average bandwidth, or another value without using the gradual increase in bandwidth that is used in the normal playback process.

Accordingly, some embodiments provide a fast channel change using an over-the-top network that is using an HTTP-based protocol that requests segments. The process avoids transcoder 116 reset during the channel switching. Also, because video delivery service 102 has control over edge servers 108, the use of multiple connections can increase the sending of the byte range for the channel change in addition to using multiple edge servers 108 to send different byte ranges. Along with the animation of the thumbnails, some embodiments provide a channel change that is faster than using just the single connection.

System

Figure 9:
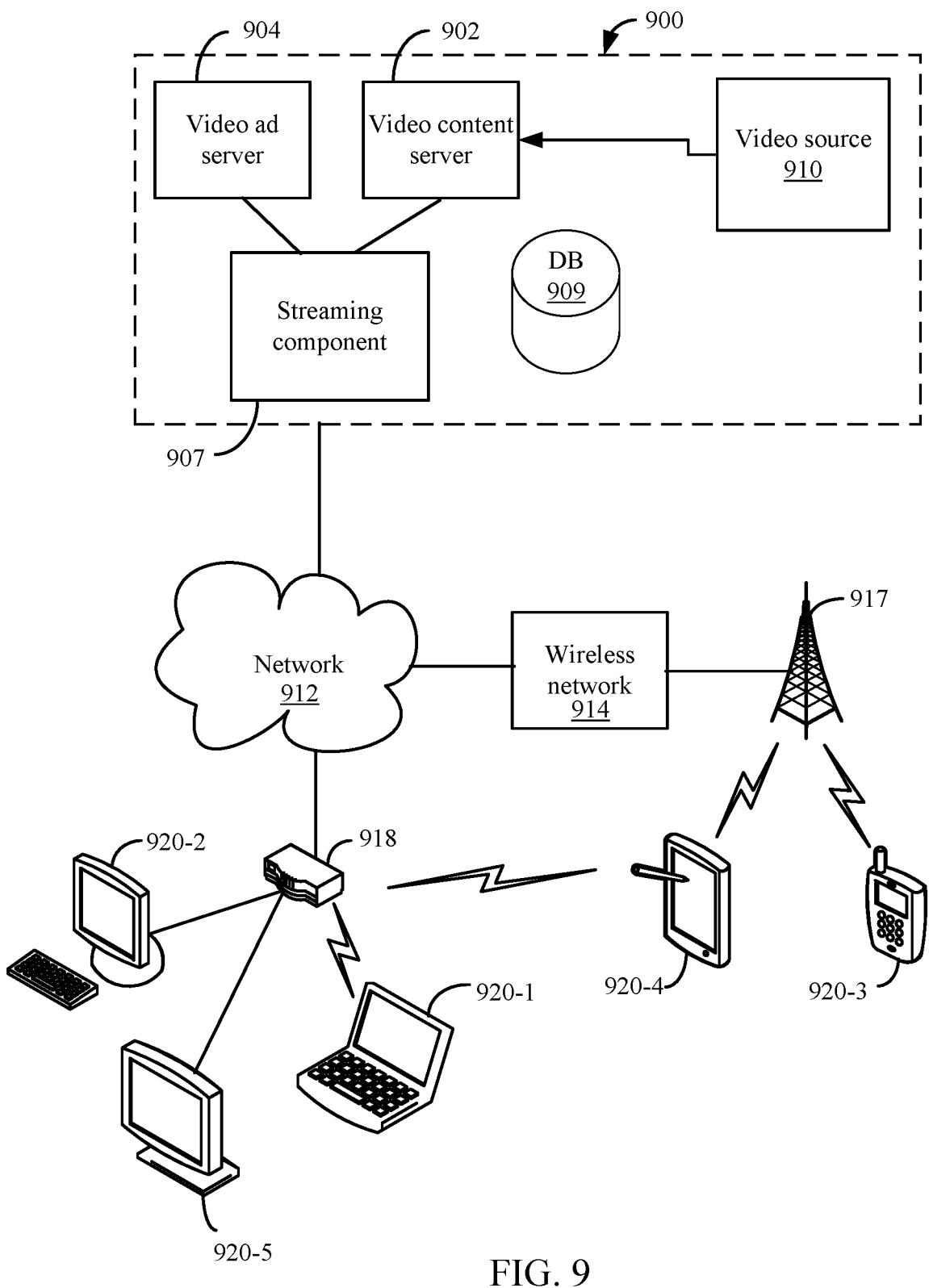
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications, and may be adapted for other applications and delivery mechanisms. The video streaming system 900 may also include edge server 108.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 900, a public service message, or some other information. The video advertising server 904 may serve the video advertising segments as directed by a user interface controller (not shown).

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912 and/or other network 914. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless telephony network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
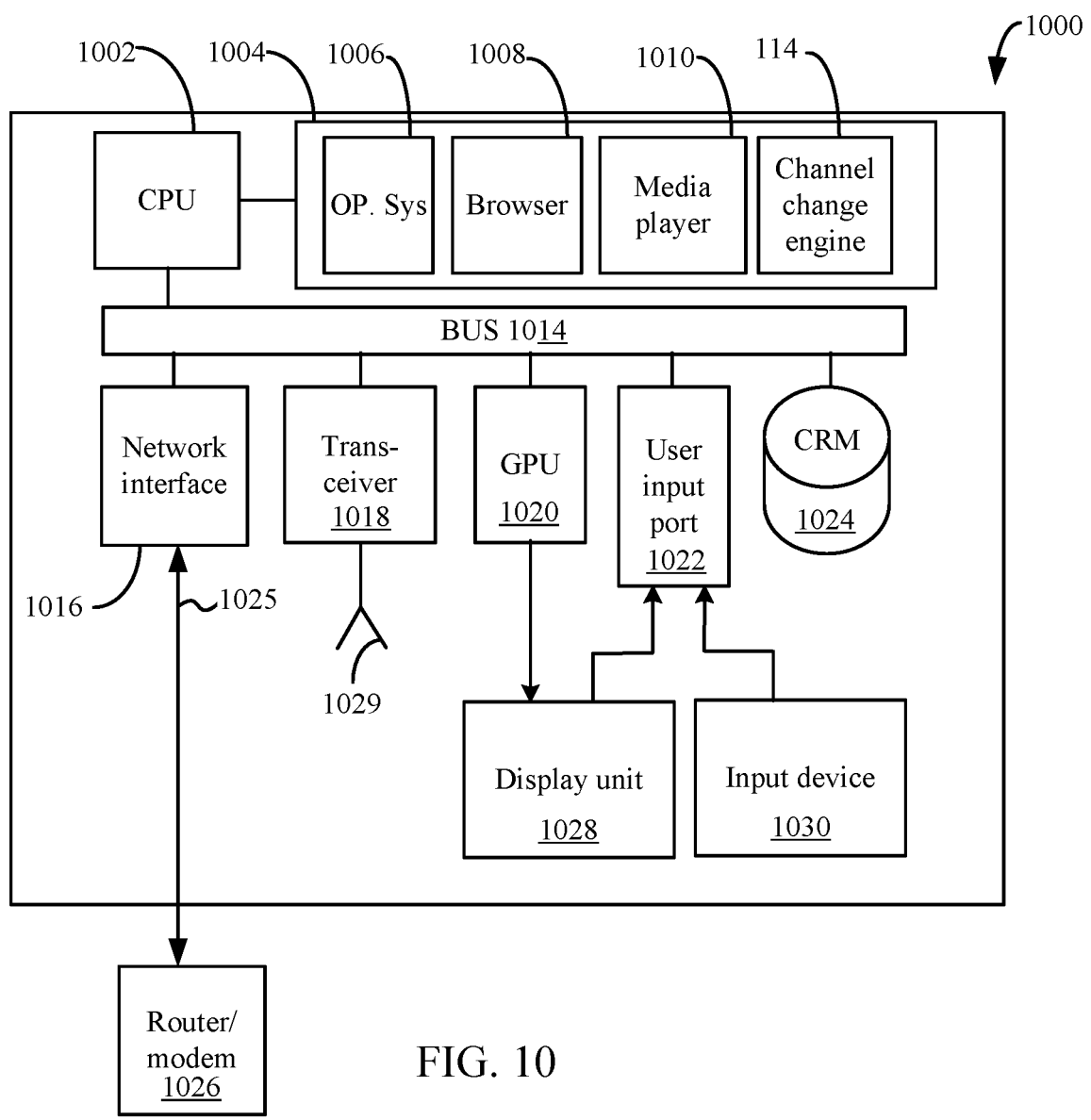
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The modules may further include channel change engine 114. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium (CRM) in a storage device 1024 may be connected to the bus 1014 and store static information and instructions for the processor 1002; for example, the storage device (CRM) 1024 may store the modules 1006, 1008, and 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    establishing, by a computing device, a single connection with a server for playback;
    receiving, by the computing device, segments of a first video from the server using the single connection, the first video being played on a first channel in a plurality of channels;
    playing, by the computing device, the segments of the first video;

receiving, by the computing device, a request to change from the first channel to a second channel in the plurality of channels;

sending, by the computing device, a plurality of requests for content of a second video being played on the second channel to one or more servers, wherein each of the plurality of requests includes a channel change indicator;

receiving, by the computing device, the content of the second video using a plurality of connections with the one or more servers, the plurality of connections being used in response to receiving the channel change indicator;

upon finishing the change from the first channel to the second channel, returning, by the computing device, to using the single connection to send a request for content of the second video without including the channel change indicator in the request; and receiving, by the computing device, the content of the second video using the single connection, the single connection being used in response to receiving the request for content without including the channel change indicator.

2. The method of claim 1, wherein the one or more servers comprise one or more other servers different from the server:

establishing at least a portion of the plurality of connections with the one or more other servers; and sending at least a portion of the plurality of requests to the one or more other servers, wherein the plurality of requests include the channel change indicator.

3. The method of claim 2, further comprising:
receiving different portions of the second video from the one or more other servers.

4. The method of claim 2, wherein the plurality of connections include multiple connections to each of the one or more servers.

5. The method of claim 1, wherein the different portions of the content of the second video are received via the plurality of connections.

6. The method of claim 1, wherein different portions of the content of the second video include portions of one or more segments of the second video that are received via the plurality of connections.

7. The method of claim 1, further comprising:
assembling different portions of the second video received via the plurality of connections in an order;
decoding the different portions of the second video; and
displaying the different portions of the second video.

8. The method of claim 1, wherein the content is received using a higher bandwidth using the plurality of connections compared with the segments received for the first video.

9. The method of claim 8, wherein the content is received at a calculated bandwidth without using a gradual increase to reach the calculated bandwidth.

10. The method of claim 1, wherein:
the plurality of connections includes a second connection with the server, and
the second connection with the server uses a first thread to process and send the content that is higher priority compared with a second thread used to process and send the segments for the first video.

11. The method of claim 10, wherein the first thread is dedicated to using a specific computer processing unit, the specific computer processing unit being dedicated for processing only channel change requests.

12. The method of claim 1, further comprising:
receiving a plurality of thumbnails for the second video; and
generating an animation of the plurality of thumbnails before displaying the content.

13. The method of claim 1, further comprising:
receiving manifests for the plurality of channels, the manifests identifying segments to request for each of the plurality of channels; and
using the manifests for the second channel to determine the content to request.

14. The method of claim 1, further comprising:
determining a first timestamp for a last portion of the first video that was transcoded;
determining one or more second timestamps for the content for the second video;
adjusting the one or more second timestamps to be sequential from the first timestamp; and
providing the content for the second video to a transcoder for decoding with the adjusted one or more second timestamps, wherein the decoder does not reset when changing from decoding the first video to the second video when using the adjusted one or more second timestamps.

15. The method of claim 1, further comprising:
receiving the content using the single connection in addition to the plurality of connections.

16. A non-transitory computer-readable storage medium containing instructions, that when executed, control a computer system to be configured for:

establishing a single connection with a server for playback;

receiving segments of a first video from the server using the single connection, the first video being played on a first channel in a plurality of channels;

playing the segments of the first video;

receiving a request to change from the first channel to a second channel in the plurality of channels;

sending a plurality of requests for content of a second video being played on the second channel to one or more servers, wherein each of the plurality of requests includes a channel change indicator;

receiving the content of the second video using a plurality of connections with the one or more servers, the plurality of connections being used in response to receiving the channel change indicator;

upon finishing the change from the first channel to the second channel, returning to using the single connection to send a request for content of the second video without including the channel change indicator in the request; and receiving, by the computing device, the content of the second video using the single connection, the single connection being used in response to receiving the request for content without including the channel change indicator.

17. A method comprising:
establishing, by a computing device, a plurality of connections with a client device, the plurality of connections including a single connection for playback and a plurality of connections for processing a channel change;

sending, by the computing device, segments of a first video using the single connection, the first video being played on a first channel in a plurality of channels, wherein the plurality of connections that were established for processing the channel change are idle while the segments of the first video are sent;

receiving, by the computing device, a request for content of a second video being played on the second channel from the client device, wherein the request includes a channel change indicator;

sending, by the computing device, at least a portion of the content of the second video using the plurality of connections, the plurality of connections being used in response to receiving the channel change indicator; and upon finishing the change from the first channel to the second channel, returning, by the computing device, to using the single connection to send the second video when a request is received via the single connection for content of the second video that does not include the channel change indicator in the request.

18. The method of claim 17, further comprising:

sending the segments of the first video using a normal playback process;

switching from the normal playback process to a channel change process when the channel change indicator is received; and sending the at least the portion of the content of the second video using the channel change process.

19. The method of claim 18, wherein the channel change process uses a higher priority thread than a thread used by the normal playback process.

20. The method of claim 17, wherein the channel change process uses a first algorithm to send the content of the second video compared to a second algorithm to send the segments of the first video, wherein the first algorithm does not gradually increase a bandwidth used to send the content of the second video and the second algorithm gradually increases the bandwidth used to send the segments of the first video.

21. The method of claim 1, wherein:

the plurality of connections includes a second connection with the server different from the single connection with the server in which the first video are received.

* * * * *